(12) United States Patent
Glugla

(10) Patent No.: US 10,378,459 B2
(45) Date of Patent: Aug. 13, 2019

(54) METHOD AND SYSTEM FOR ENGINE CONTROL

(71) Applicant: Ford Global Technologies, LLC, Dearborn, MI (US)

(72) Inventor: Chris Paul Glugla, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 149 days.

(21) Appl. No.: 15/467,957

(22) Filed: Mar. 23, 2017

(65) Prior Publication Data

US 2018/0274458 A1 Sep. 27, 2018

(51) Int. Cl.
| | | |
|---|---|---|
| *F02D 15/02* | (2006.01) | |
| *F02D 35/02* | (2006.01) | |
| *F02B 37/18* | (2006.01) | |
| *F02B 75/04* | (2006.01) | |
| *F02P 5/152* | (2006.01) | |
| *F02D 41/22* | (2006.01) | |
| *F02D 13/02* | (2006.01) | |
| *F01B 31/14* | (2006.01) | |

(52) U.S. Cl.
CPC ............. *F02D 15/02* (2013.01); *F01B 31/14* (2013.01); *F02B 37/183* (2013.01); *F02B 75/04* (2013.01); *F02B 75/045* (2013.01); *F02D 13/0226* (2013.01); *F02D 35/027* (2013.01); *F02D 35/028* (2013.01); *F02D 41/22* (2013.01); *F02P 5/152* (2013.01); *F02P 5/1528* (2013.01); *F02D 2041/227* (2013.01); *F02D 2041/228* (2013.01); *F02D 2700/03* (2013.01); *Y02T 10/144* (2013.01)

(58) Field of Classification Search
CPC ...... F02B 37/18; F02B 37/183; F02B 37/186; F02B 75/045; F02D 15/02; F02D 35/027; F02P 5/1528
USPC ......... 60/602; 123/48 B, 48 R, 78 A, 78 BA, 123/78 E
See application file for complete search history.

(56) References Cited

U.S. PATENT DOCUMENTS

| | | | |
|---|---|---|---|
| 6,318,308 B1 | 11/2001 | Hsu et al. | |
| 6,349,698 B2 | 2/2002 | Park | |
| 6,510,821 B2 * | 1/2003 | Fujimoto | F02B 75/045 |
| | | | 123/48 B |
| 6,553,949 B1 | 4/2003 | Kolmanovsky et al. | |
| 6,564,769 B2 | 5/2003 | Kolmanovsky et al. | |
| 6,604,495 B2 * | 8/2003 | Moteki | F02B 75/045 |
| | | | 123/48 B |

(Continued)

FOREIGN PATENT DOCUMENTS

| | | | | |
|---|---|---|---|---|
| EP | 2902603 A1 * | 8/2015 | ............ | F02B 75/048 |
| EP | 3203051 A1 * | 8/2017 | ............ | F02D 15/02 |

(Continued)

*Primary Examiner* — Thai Ba Trieu
(74) *Attorney, Agent, or Firm* — Julia Voutyras; McCoy Russell LLP

(57) ABSTRACT

Methods and systems are provided for indicating degradation of a VCR mechanism that mechanically alters a cylinder compression ratio. Degradation is detected based on an elevated knock incidence and increased spark retard usage. If the VCR mechanism is stuck, knock and pre-ignition that could be induced by continued operation in a higher than intended compression ratio is mitigated by limiting the engine load.

20 Claims, 5 Drawing Sheets

(56) References Cited

U.S. PATENT DOCUMENTS

| | | | | |
|---|---|---|---|---|
| 6,631,708 | B1* | 10/2003 | Russell | F02D 15/02 123/78 E |
| 6,758,202 | B2* | 7/2004 | Russell | F02D 15/02 123/78 E |
| 7,188,020 | B2* | 3/2007 | Yasui | F02D 41/1401 701/103 |
| 7,370,613 | B2* | 5/2008 | Lawrence | F02D 15/02 123/48 B |
| 7,392,795 | B2* | 7/2008 | Nagamine | F02D 41/3041 123/48 R |
| 7,467,041 | B2* | 12/2008 | Okubo | G01L 3/245 123/78 E |
| 8,087,390 | B2 | 1/2012 | Hiyoshi et al. | |
| 8,495,984 | B2 | 7/2013 | Riegel et al. | |
| 8,555,829 | B2* | 10/2013 | Lee | F02D 15/02 123/48 B |
| 8,671,895 | B2* | 3/2014 | Inden | F02B 75/048 123/48 B |
| 2002/0043228 | A1* | 4/2002 | Moteki | F02B 75/045 123/78 E |
| 2003/0111067 | A1* | 6/2003 | Russell | F02D 15/02 123/78 E |
| 2005/0103290 | A1* | 5/2005 | Magner | F01L 1/022 123/90.16 |
| 2014/0261336 | A1* | 9/2014 | Takahashi | F02D 15/02 123/48 R |
| 2015/0034052 | A1* | 2/2015 | Shimizu | F02D 15/02 123/48 R |
| 2016/0076436 | A1* | 3/2016 | Nakamura | F02D 13/0207 123/48 R |
| 2018/0195487 | A1* | 7/2018 | Oryoji | F02D 41/0007 |
| 2018/0209354 | A1* | 7/2018 | Takahashi | F02B 75/32 |

FOREIGN PATENT DOCUMENTS

| | | | | |
|---|---|---|---|---|
| JP | 2001317383 | A | * 11/2001 | ............ F02B 75/045 |
| JP | 2010216276 | A | * 9/2010 | ............ F02B 75/045 |
| JP | 2010229642 | A | * 10/2010 | |
| JP | 2011252505 | A | * 12/2011 | |
| JP | 2012193635 | A | * 10/2012 | |
| JP | 2014062496 | A | * 4/2014 | ......... F02D 15/02 |
| JP | 2017015062 | A | * 1/2017 | ......... F02D 41/0007 |

* cited by examiner

| BMEP | 1000 | 1500 | 2000 | 2500 | 5000 |
|---|---|---|---|---|---|
| -2 | 13 | 13 | 13 | 13 | 13 |
| -1 | 13 | 13 | 13 | 13 | 13 |
| 0 | 13 | 13 | 13 | 13 | 13 |
| 1 | 13 | 13 | 13 | 13 | 13 |
| 2 | 13 | 13 | 13 | 13 | 13 |
| 3 | 13 | 13 | 13 | 13 | 13 |
| 4 | 13 | 13 | 13 | 13 | 13 |
| 5 | 12.75 | 13 | 13 | 13 | 13 |
| 6 | 11 | 12.5 | 13 | 13 | 13 |
| 7 | 10.25 | 11.25 | 12.25 | 13 | 13 |
| 8 | 10 | 10.75 | 11.75 | 13 | 13 |
| 9 | 9.75 | 10.25 | 11 | 11.25 | 13 |
| 10 | 8.75 | 10 | 10.5 | 10.75 | 10.5 |
| 11 | 8.25 | 9.75 | 10 | 10.25 | 10.25 |
| 12 | 8 | 9.25 | 10 | 10 | 10 |
| 13 | 8 | 9 | 10 | 10 | 10 |
| 14 |  | 9 | 9.75 | 10 | 10 |
| 15 |  | 8 | 9.25 | 9.75 | 10 |
| 16 |  | 8 | 8.75 | 9.25 | 8.5 |
| 17 |  | 8 | 8.5 | 8.5 | 8.25 |
| 18 |  | 8 | 8 | 8 | 8 |
| 20 |  | 8 | 8 | 8 | 8 |
| 22 |  | 8 | 8 | 8 | 8 |
| 24 |  | 8 | 8 | 8 | 8 |

FIG. 5

METHOD AND SYSTEM FOR ENGINE CONTROL

FIELD

The present description relates generally to methods and systems for controlling an engine responsive to degradation of a variable compression ratio mechanism.

BACKGROUND/SUMMARY

The compression ratio of an internal combustion engine is defined as the ratio of the cylinder volume when the piston is at bottom-dead-center (BDC) to the cylinder volume when the piston is at top-dead-center (TDC). In general, the higher the compression ratio, the higher the thermal efficiency of the internal combustion engine. This in turn results in improved fuel economy and a higher ratio of output energy versus input energy of the engine. In conventional engines, the compression ratio is fixed and thus the engine efficiency cannot be optimized during operating conditions to improve fuel economy and engine power performance.

In variable compression ratio (VCR) engines, the engine may be equipped with various mechanisms to mechanically alter the volumetric ratio between the piston TDC and BDC, allowing for the compression ratio be varied as engine operating conditions change. As a non-limiting example, the VCR engine may be configured with a piston displacement changing mechanism (e.g., an eccentric) that moves the pistons closer to or further from the cylinder head, thereby changing the size of the combustion chambers. Still other engines may alter a cylinder head volume.

One example approach for leveraging the benefits of a VCR mechanism is shown by Kolmanovsky et al in U.S. Pat. No. 6,553,949. Therein, a higher compression ratio may be used in low engine speed-load regions to increase thermal efficiency. A lower compression ratio may be used in higher engine speed-load regions. Further, knock may be mitigated in the low speed-load region using spark retard, while knock is mitigated in the higher speed-load region via adjustments to the compression ratio. When the engine becomes spark limited while operating in the higher compression ratio, the combustion phasing retard may erode the thermal efficiency benefit of the compression ratio. At that time, the compression ratio may be lowered while spark timing is advanced so as to provide a more efficient balance between combustion phasing and thermal efficiency. In addition, hunting between different levels of compression is reduced and a given compression ratio may be used more effectively.

However the inventors herein have identified potential issues with such a system. As one example, the VCR mechanism may degrade resulting in the engine operating at a compression ratio different from that desired. For example, the VCR mechanism may get stuck. If the mechanism gets stuck in a higher than desired compression ratio, such as when the mechanism gets stuck while in a higher compression ratio setting, or during a transition to a lower compression ratio setting (but before reaching the lower compression ratio setting), the risk of engine knock and pre-ignition may increase. In particular, higher pressures at the time of spark can lead to higher temperatures and higher probability of auto-ignition of the unburned end gases. Knock and pre-ignition incidence can reduce the life of engine components.

In one example, the above issue may be at least partly addressed by a method for an engine comprising: mechanically varying a compression ratio of an engine via a variable compression ratio mechanism; and responsive to the mechanism being degraded, limiting an engine load. In this way, knock or pre-ignition induced due to VCR mechanism degradation is reduced.

As an example, an engine may be configured with a VCR mechanism that, when actuated, mechanically varies the position of a piston within the combustion chamber, thereby varying the compression ratio. Responsive to engine operating conditions, the compression ratio may be varied, such as by applying a relatively higher compression ratio at lower engine loads to leverage an increased thermal efficiency benefit, while transitioning to a relatively lower compression ratio at higher engine loads to leverage a combustion phasing benefit. The VCR mechanism may become stuck during the transition between the higher and lower compression ratio settings. Degradation of the VCR mechanism may be inferred based on feedback regarding a position of the VCR mechanism, such as via a position sensor coupled to the mechanism. For example, if the detected position is different from the commanded position, it may be inferred that the mechanism is stuck in the wrong compression ratio. Alternatively, degradation of the VCR mechanism may be inferred responsive to a higher than expected knock incidence and/or adaptive knock being retarded to a threshold earlier than expected. The stuck compression ratio may be determined based on position sensor feedback or based on the knock incidence. The engine load may then be limited to a clip that corresponds to the highest load possible for the given stuck compression ratio. An intake air charge may be reduced to limit the load, such as by reducing the opening of an intake throttle or by increasing the opening of an exhaust waste-gate valve. In addition, borderline spark may be adjusted based on the stuck compression ratio. Spark timing may then be advanced.

In this way, a variable compression ratio mechanism may be better protected from recurrent knock and pre-ignition. The technical effect of limiting intake aircharge to limit engine load responsive to degradation of the variable compression ratio mechanism is that recurrent knock may be averted. In particular, thermal stress that may be incurred in a cylinder due to operation at a higher than intended compression ratio may be reduced (such as may occur due to the mechanism being stuck in a higher than intended compression ratio setting). In addition, the engine may be operated with spark advanced from a spark retard limit. Overall, engine component life may be extended.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 5 depicts an example look-up table that may be used for mapping a compression ratio to engine speed-load conditions.

DETAILED DESCRIPTION

The following description relates to systems and methods for reducing the risk of knock and pre-ignition in an engine system configured with a variable compression ratio (VCR) mechanism, as described with reference to the engine system of FIG. 1. By actuating the VCR mechanism, a position of a piston within a combustion chamber can be varied, allowing for improvements in thermal efficiency. A controller may be configured to perform a control routine, such as the example routine of FIG. 2, to vary a compression ratio of the engine based on engine operating conditions, such as by referring to the table of FIG. 5. In response to degradation of the VCR mechanism, the controller may clip an engine load based on the compression ratio at which the mechanism is stuck. The controller may detect VCR mechanism degradation based on feedback regarding a position of the mechanism, or based on knock frequency and adaptive spark retard usage, as described at FIG. 3. An example engine operation with VCR and engine load adjustments is shown at FIG. 4. In this way, VCR degradation may be timely identified and addressed.

Figure 1:
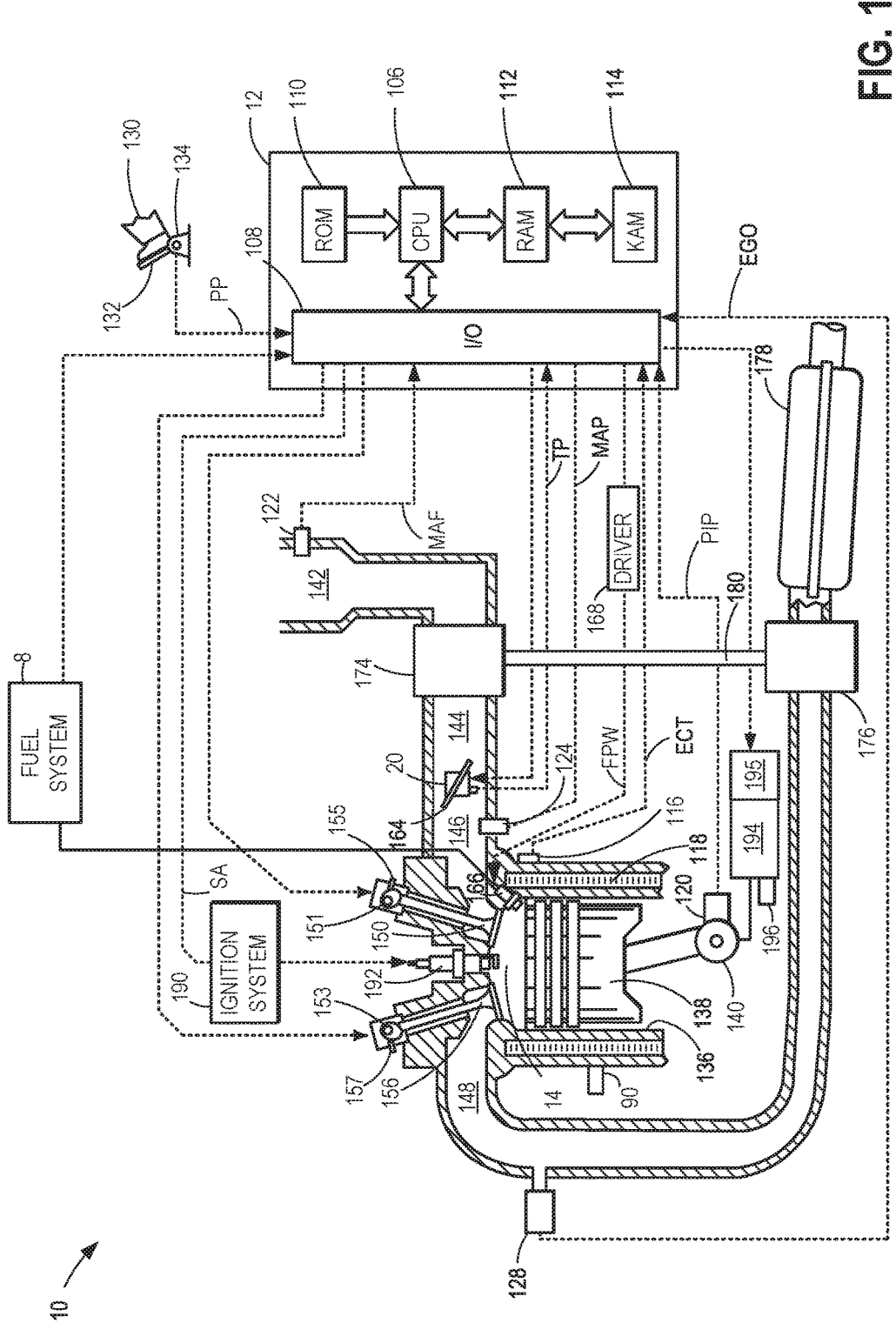
FIG. 1 illustrates an example engine system configured with a variable compression ratio mechanism.

FIG. 1 depicts an example embodiment of a combustion chamber within a cylinder of internal combustion engine 10. Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. The combustion chamber 14 within the cylinder of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Engine 10 may be configured as a variable compression ratio (VCR) engine wherein the compression ratio (CR) of each cylinder (that is, the ratio of the cylinder volume when the piston is at bottom-dead-center (BDC) to the cylinder volume when the piston is at top-dead-center (TDC)) can be mechanically altered. The CR of the engine may be varied via a VCR actuator 195 actuating a VCR mechanism 194. In some example embodiments, the CR may be varied between a first, lower CR (wherein the ratio of cylinder volume when the piston is at BDC to the cylinder volume when the piston is at TDC is smaller) and a second, higher CR (wherein the ratio is higher). In still other example embodiments, there may be predefined number of stepped compression ratios. Further still, the CR may be continuously variable between the first, lower CR and the second, higher CR (to any CR in between).

In the depicted example, VCR mechanism 194 is coupled to piston 138 such that the VCR mechanism may change the piston TDC position. For example, piston 138 may be coupled to crankshaft 140 via a piston position changing VCR mechanism 194 that moves the pistons closer to or further from the cylinder head, thus changing the size of combustion chamber 14. A position sensor 196 may be coupled to the VCR mechanism 194 and may be configured to provide feedback to controller 12 regarding the position of VCR mechanism 194 (and thereby the compression ratio) being applied to the cylinder.

In one example, changing the position of the piston within the combustion chamber also changes the relative displacement of the piston within the cylinder. The piston position changing VCR mechanism may be coupled to a conventional cranktrain or an unconventional cranktrain. Non-limiting examples of an unconventional cranktrain to which the VCR mechanism may be coupled include variable distance head crankshafts and variable kinematic length crankshafts. In one example, crankshaft 140 may be configured as an eccentric shaft. In another example, an eccentric may be coupled to, or in the area of a piston pin, the eccentric changing the position of the piston within the combustion chamber. Movement of the eccentric may be controlled by oil passages in the piston rod.

It will be appreciated that still other VCR mechanisms that mechanically alter the compression ratio may be used. For example, the CR of the engine may be varied via a VCR mechanism that changes a cylinder head volume (that is, the clearance volume in the cylinder head). In still another example, the VCR mechanism may include a hydraulic pressure, air pressure, or mechanical reactive piston. Further still, the VCR mechanism may include a multi-link mechanism or a bent rod mechanism. Still other VCR mechanizations may be possible. It will be appreciated that as used herein, the VCR engine may be configured to adjust the CR of the engine via mechanical adjustments that vary a piston position or a cylinder head volume. As such, VCR mechanisms do not include CR adjustments achieved via adjustments to a valve or cam timing.

By adjusting the position of the piston within the cylinder, an effective (static) compression ratio of the engine (that is a difference between cylinder volumes at TDC relative to BDC) can be varied. In one example, reducing the compression ratio includes reducing a displacement of the piston within the combustion chamber by increasing a distance between a top of the piston from a cylinder head. For example, the engine may be operated at a first, lower compression ratio by the controller sending a signal to actuate the VCR mechanism to a first position where the piston has a smaller effective displacement within the combustion chamber. As another example, the engine may be operated at a second, higher compression ratio by the controller sending a signal to actuate the VCR mechanism to a second position where the piston has a larger effective displacement within the combustion chamber. Changes in the engine compression ratio may be advantageously used to improve fuel economy. For example, a higher compression ratio may be used to improve fuel economy at light to moderate engine loads until spark retard from early knock onset erodes the fuel economy benefit. The engine can then be switched to a lower compression ratio, thereby trading off thermal efficiency for combustion phasing efficiency. Continuous VCR systems may continuously optimize the combustion phasing and the thermal efficiency to provide the best compression ratio between the higher compression ratio and lower compression ratio limits at the given operating conditions. In one example, an engine controller may refer a look-up table, such as table 500 of FIG. 5, to select a compression ratio to apply based on engine speed-load conditions. As elaborated below, the selecting may include selecting a lower compression ratio at higher engine loads, and selecting a higher compression ratio at lower engine loads.

There may be conditions where the VCR mechanism gets degraded, such as when the mechanism gets stuck in an unintended compression ratio. For example, the mechanism may get stuck in a higher compression ratio setting when commanded to transition to a lower compression ratio setting. Extended unintended operation in the higher compression ratio can lead to an increase in the propensity for knock and pre-ignition. As elaborated with reference to FIG. 2, in response to an indication of VCR mechanism degradation, the controller may limit an engine load to reduce the incidence on knock and pre-ignition. Further, the indication of VCR mechanism degradation may be inferred based on feedback from a position sensor coupled to the VCR mechanism (such as position sensor 196) and/or based on knock frequency and adaptive spark usage responsive to knock occurrence.

Cylinder 14 can receive intake air via a series of intake air passages 142, 144, and 146. Intake air passage 146 can communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor of the engine. A throttle 20 including a throttle plate 164 may be provided along an intake passage of the engine for varying the flow rate and/or pressure of intake air provided to the engine cylinders. For example, throttle 20 may be disposed downstream of compressor 174 as shown in FIG. 1, or alternatively may be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 150 and exhaust valve 156 may be determined by valve position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

The cylinder of engine 10 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock. The compression ratio may also be varied based on driver demand via adjustments to a VCR actuator 195 that actuates a VCR mechanism 194, varying the effective position of piston 138 within combustion chamber 14. The compression ratio may be inferred based on feedback from sensor 196 regarding the position of the VCR mechanism 194.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 14 is shown including one fuel injector 166. Fuel injector 166 is shown coupled directly to cylinder 14 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 14. While FIG. 1 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, injector 166 may be a port injector providing fuel into the intake port upstream of cylinder 14.

It will also be appreciated that while the depicted embodiment illustrates the engine being operated by injecting fuel via a single direct injector; in alternate embodiments, the engine may be operated by using two or more injectors (for example, a direct injector and a port injector per cylinder, or two direct injectors/two port injectors per cylinder, etc.) and varying a relative amount of injection into the cylinder from each injector.

Fuel may be delivered by the injector to the cylinder during a single cycle of the cylinder. Further, the distribution and/or relative amount of fuel delivered from the injector may vary with operating conditions. Furthermore, for a single combustion event, multiple injections of the delivered fuel may be performed per cycle. The multiple injections may be performed during the compression stroke, intake stroke, or any appropriate combination thereof. Also, fuel may be injected during the cycle to adjust the air-to-injected fuel ratio (AFR) of the combustion. For example, fuel may be injected to provide a stoichiometric AFR. An AFR sensor may be included to provide an estimate of the in-cylinder AFR. In one example, the AFR sensor may be an exhaust gas sensor, such as EGO sensor 128. By measuring an amount of residual oxygen (for lean mixtures) or unburned hydrocarbons (for rich mixtures) in the exhaust gas, the sensor may determine the AFR. As such, the AFR may be provided as a Lambda ($\lambda$) value, that is, as a ratio of actual AFR to stoichiometry for a given mixture. Thus, a Lambda of 1.0 indicates a stoichiometric mixture, richer than stoichiometry mixtures may have a lambda value less than 1.0, and leaner than stoichiometry mixtures may have a lambda value greater than 1.

As described above, FIG. 1 shows only one cylinder of a multi-cylinder engine. As such each cylinder may similarly include its own set of intake/exhaust valves, fuel injector(s), spark plug, etc.

Fuel tanks in fuel system 8 may hold fuel with different fuel qualities, such as different fuel compositions. These differences may include different alcohol content, different octane, different heat of vaporizations, different fuel blends, and/or combinations thereof etc.

Engine 10 may further include a knock sensor 90 coupled to each cylinder 14 for identifying abnormal cylinder combustion events. In alternate embodiments, one or more knock sensors 90 may be coupled to selected locations of the engine block. The knock sensor may be an accelerometer on the cylinder block, or an ionization sensor configured in the spark plug of each cylinder. The output of the knock sensor may be combined with the output of a crankshaft acceleration sensor to indicate an abnormal combustion event in the cylinder. In one example, based on the output of knock sensor 90 in one or more defined windows (e.g., crank angle timing windows), abnormal combustion due to one or more of knock and pre-ignition may be identified and differentiated. For example, knock may be identified responsive to knock sensor output estimated in a knock window being higher than a knock threshold, while pre-ignition may be identified responsive to knock sensor output estimated in a pre-ignition window being higher than a pre-ignition threshold, the pre-ignition threshold higher than the knock threshold, the pre-ignition window earlier than the knock window.

Further, the abnormal combustion may be accordingly addressed. For example, knock may be addressed by reducing the compression ratio and/or retarding spark timing while pre-ignition may be addressed by enriching the engine and/or limiting an engine load. In addition, lowering the compression ratio also reduces the changes of further pre-ignition. As elaborated herein with reference to FIG. 3, knock frequency can also be used to indicate degradation of a VCR mechanism, such as may occur when the VCR mechanism is stuck in an unintended compression ratio setting (that may be higher or lower than the intended compression ratio setting).

Returning to FIG. 1, controller 12 is shown as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; absolute manifold pressure signal (MAP) from sensor 124, cylinder AFR from EGO sensor 128, abnormal combustion from knock sensor 90 and a crankshaft acceleration sensor, and VCR mechanism position from position sensor 196. Engine speed signal, RPM, may be generated by controller 12 from signal PIP. Manifold pressure signal MAP from a manifold pressure sensor may be used to provide an indication of vacuum, or pressure, in the intake manifold. The controller 12 receives signals from the various sensors of FIG. 1 and employs the various actuators of FIG. 1 to adjust engine operation based on the received signals and instructions stored on a memory of the controller. For example, based on the engine speed and load, the controller may adjust the compression ratio of the engine by sending a signal to the VCR actuator which actuates the VCR mechanism to mechanically move the piston closer to or further from the cylinder head, to thereby change a volume of the combustion chamber. As another example, the controller may compare an output from the position sensor coupled to the VCR mechanism to a commanded signal to the VCR mechanism to determine if the VCR mechanism is stuck at an unintended compression ratio setting. In response to the VCR mechanism being stuck, for example at a higher than intended compression ratio setting, the controller may send a signal to an intake throttle to limit the aircharge to the engine, thereby limiting the engine load, so as to reduce the propensity for knock and pre-ignition induced by the continued operation at the elevated compression ratio setting.

Non-transitory storage medium read-only memory 110 can be programmed with computer readable data representing instructions executable by processor 106 for performing the methods described below as well as other variants that are anticipated but not specifically listed.

In this way the systems of FIG. 1 provides for an engine system comprising: an engine having a cylinder; a variable compression ratio mechanism for mechanically altering a piston position within the cylinder; a position sensor coupled to the variable compression ratio mechanism; a spark plug for providing spark to the cylinder; an intake throttle; a turbocharger having an intake compressor driven an exhaust turbine; a wastegate including a wastegate actuator coupled to the exhaust turbine; a knock sensor; and a controller configured with computer readable instructions stored on non-transitory memory for: actuating the variable compression ratio mechanism to transition the engine from a higher compression ratio setting to a lower compression ratio setting; indicating that the mechanism is stuck at the higher compression ratio setting based on output from one or more of the position sensor and the knock sensor; and responsive to the indication, reducing an aircharge delivered to the engine while retarding spark timing. The indicating may include indicating that the mechanism is stuck at the higher compression ratio setting responsive to one or more of a frequency of knock, as indicated based on the output from the knock sensor, being higher than a threshold frequency, and an actual position of the mechanism, as indicated based on the output from the position sensor, being different from a commanded position, each of the commanded position and the threshold frequency based on the lower compression ratio setting. Reducing the aircharge may include one or more of reducing an opening of the intake throttle and increasing an opening of the wastegate actuator to limit a maximum engine load allowable at the higher compression ratio setting. The controller may include further instructions for, responsive to an indication of pre-ignition, different from knock, as indicated based on the output of the knock sensor after reducing the intake aircharge, further limiting the maximum engine load allowable at the higher compression ratio setting.

Figure 2:
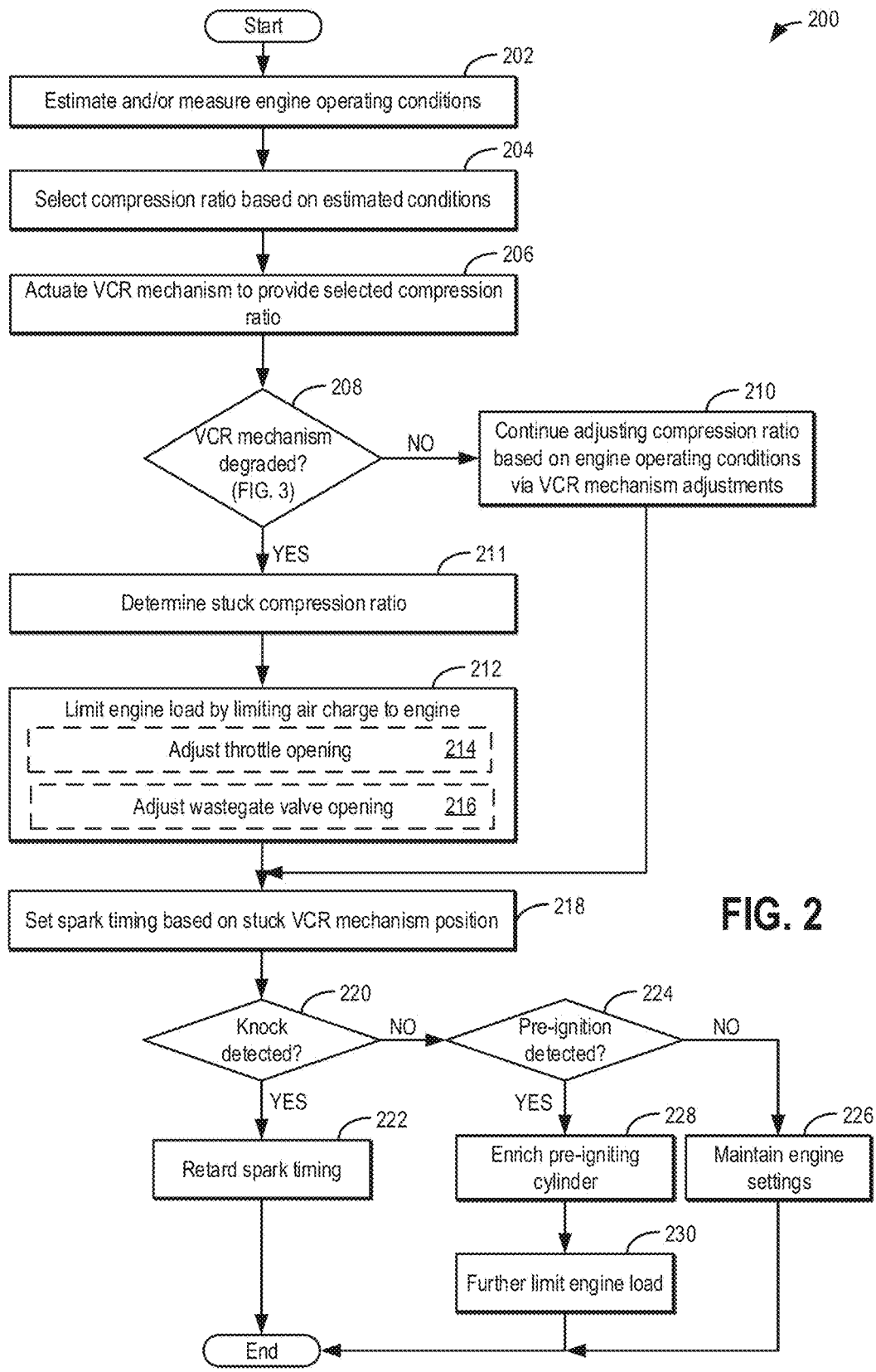
FIG. 2 shows a high level flow chart for limiting an engine load responsive to an indication of VCR mechanism degradation.

Now turning to FIG. 2, an example routine 200 is described for limiting an engine load responsive to an indication of VCR mechanism degradation. The method reduces the incidence of knock and pre-ignition induced by continued operation at a higher than intended compression ratio. Instructions for carrying out method 200 as well the other methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 202, method 200 includes estimating and/or measuring engine operating conditions. Engine operating conditions may include, for example, driver power demand (for example, as based on an output of a pedal position sensor coupled to an operator pedal); ambient temperature, pressure, and humidity; engine temperature; manifold pressure (MAP); manifold air flow (MAF); catalyst temperature; intake temperature; boost level; fuel octane of fuel available in a fuel tank; etc.

At 204, method 200 includes selecting a compression ratio for operating the engine based on the estimated engine operating conditions. The engine may be configured with a VCR mechanism (e.g., VCR mechanism 194 of FIG. 1) that mechanically alters the engine compression ratio between a first, lower and a second, higher compression ratio setting. The VCR mechanism may achieve this by mechanically altering a piston position within a cylinder. Alternatively, multiple compression ratios between the first and second compression ratio may be possible. The controller may compare the fuel efficiency at each compression ratio of the engine at the given driver power demand and select the compression ratio that provides the highest fuel efficiency. The controller may compare the fuel efficiency at each compression ratio by comparing the brake specific fuel consumption (BSFC) of the engine at each compression ratio, for example. The fuel efficiency of the engine at each compression ratio may be determined via a table, a map, an algorithm, and/or an equation, each stored as a function of operating conditions (e.g., engine speed, torque, temperature, humidity, inferred fuel octane, etc.).

In one example, the controller may refer to a look-up table or map, such as table 500 of FIG. 5, to select a compression for operating the engine based on engine speed-load conditions. As shown at map 500, as engine load or BMEP increases, the compression ratio selected may be decreased. Thus a lower compression ratio is selected at higher engine loads and a higher compression ratio is selected at lower engine loads.

At 206, method 200 includes actuating the VCR mechanism to provide the selected compression ratio. For example, the controller may send a signal to a VCR actuator (e.g., VCR actuator 195 of FIG. 1) coupled to the VCR mechanism to actuate the mechanism to a position that provides the selected compression ratio. In one example, the controller may send a signal to actuate the VCR mechanism to a higher compression ratio setting at low-to-moderate engine speeds and loads. As another example, the controller may send a signal to actuate the VCR mechanism to a lower compression ratio setting at moderate-to-high engine speeds and loads.

At 208, method 200 includes determining if the VCR mechanism is degraded. In particular, it may be determined if the VCR mechanism is stuck at a compression ratio setting that is different from the intended compression ratio setting for the given engine speed-load conditions. As elaborated below with respect to FIG. 3, VCR mechanism degradation may be inferred based on output of a VCR position sensor indicating that a position of the VCR mechanism differs from an expected position based on the intended compression ratio setting. As another example, VCR mechanism degradation may be inferred based on the output of a knock sensor indicating that a knock frequency is greater than a threshold frequency, for example. Further still, VCR mechanism degradation may be indicated responsive to adaptive spark being retarded more than expected.

If it is determined that the VCR mechanism is not degraded, method 200 proceeds to 210 wherein the controller continues adjusting the compression ratio of the engine based on engine operating conditions via VCR mechanism adjustments. For example, the controller may continue comparing the fuel efficiency at each compression ratio of the engine at the given driver power demand and select the compression ratio that provides the highest fuel efficiency, as described at 204, and continue actuating the VCR actuator to actuate the VCR mechanism that provides the selected compression ratio, as described at 206. Method 200 may then proceed to 220, as will be described below.

If it determined that the VCR mechanism is degraded at 208, method 200 proceeds to 211 to determine the stuck compression ratio. For example, the VCR mechanism may be degraded during a transition between compression ratio settings (such as when the engine is at a higher compression ratio setting and is commanded to a lower compression ratio setting, or when the engine is at a lower compression ratio setting and is commanded to a higher compression ratio setting). The controller may determine the stuck compression ratio based on a sensed position of the VCR mechanism. For example, based on output from a position sensor coupled to the VCR mechanism (e.g., sensor 196 of FIG. 1), the controller may determine an actual position of the VCR mechanism. If the actual position, as sensed, does not match the expected position, as commanded, the controller may learn the actual position as the stuck position and determine the corresponding stuck compression ratio. The VCR mechanism may be stuck at the lower compression ratio when commanded to the higher ratio, may be stuck at the higher compression ratio when commanded to the lower ratio, or may be stuck in a position in-between the initial and the commanded ratios. In other examples, the stuck compression ratio may be inferred based on, for example, knock incidence, adaptive spark, etc.

The method then moves to 212 where the method includes, responsive to the indication of VCR mechanism degradation, limiting the engine load by limiting the air charge to the engine. In particular, the controller may limit the maximum engine load that is allowable based on the stuck compression ratio, and independent of the intended compression ratio. In one example, when commanded to transition to a lower compression ratio setting, the VCR mechanism may be stuck at a higher compression ratio setting (or in-between the higher and lower compression ratio settings). For example, the controller may operate the engine at the higher compression ratio at lower operator torque demands (and lower engine loads) due to increased thermal efficiency at the higher compression ratio setting. However, knock may occur at the higher compression ratio, leading to the use of spark retard. Once adaptive spark has been sufficiently retarded, the engine may become spark limited to the point where combustion phasing retard erodes the thermal efficiency benefit of operating at the higher compression ratio. Responsive to adaptive spark being retarded to a limit while operating at the higher compression ratio, the controller may command a transition to the lower compression ratio. However, the VCR mechanism may be stuck at the higher compression ratio setting (or in-between the higher and lower compression ratio settings) during the transitioning. Herein, responsive to the indication of VCR mechanism degradation, the controller may lower the maximum air charge that can be received in the engine while stuck in the higher compression ratio setting, thereby reducing the maximum engine load and the maximum boost pressure achievable in the stuck compression ratio. Consequently, the cylinder may be operated at the higher compression ratio with a less limited engine load (and less limited air charge flow) when the VCR mechanism is not degraded, but operated at the higher compression ratio with a more limited engine load (and more limited air charge flow) when the VCR mechanism is degraded.

By limiting the intake aircharge, the engine load may be actively kept lower than a limit for the cylinder in the stuck compression ratio. Consequently, high pressure in-cylinder vibrations from knock and/or pre-ignition that can occur due to extended operation in the stuck compression ratio may be reduced. By reducing the propensity for knock and pre-ignition when operating in an unintended compression ratio due to VCR mechanism degradation, engine component life can be improved and the VCR mechanism can be fixed in a timely manner.

Limiting the engine load by limiting the air charge to the engine may include adjusting an intake throttle opening, as indicated at 214, and/or adjusting a wastegate valve opening, as indicated at 216. For example, a throttle valve (e.g., throttle valve 20 of FIG. 1) positioned within an air intake passage of the engine may be actuated to a more closed position, thereby reducing an intake throttle opening at the stuck compression ratio. This decreases an amount of air flowing through the throttle valve and into cylinders of the engine. In another example, if the engine is a turbocharged engine, a wastegate valve or actuator of a wastegate coupled across an exhaust turbine may be actuated to a more open position. By increasing an opening of the wastegate actuator, an amount of exhaust gas flowing through the wastegate while bypassing the exhaust turbine may be increased, thereby decreasing turbine speed, and, in turn, a mass flow through an intake compressor driven by the exhaust turbine. The decreased mass flow through the compressor decreases boost pressure and air charge flow to the engine.

The required degree of load limiting and the corresponding position of the throttle valve or the wastegate actuator that is commanded may be determined as a function of the stuck compression ratio, and other engine operating conditions such as MAF and MAP. For example, a higher degree of load limiting may be applied when the VCR mechanism is stuck in a higher that intended compression ratio since extended operation at a higher than intended compression ratio can increase the propensity for abnormal combustion events such as knock and pre-ignition. As another example, a lower degree of load limiting may be applied when the VCR mechanism is stuck in a lower that intended compression ratio. The controller may refer a map, algorithm, look-up table, etc., which includes the stuck compression ratio and intended compression ratio as inputs, and the desired degree of load limiting (including a corresponding throttle position and/or wastegate valve position) as the output. In some examples, the position of the wastegate valve may be further based on the position of the intake throttle.

At 218, method 200 includes setting spark timing based on the measured VCR mechanism position (as determined based on output from the position sensor, for example). That is, spark is scheduled based on the stuck compression ratio, and independent of the intended compression ratio (and intended VCR position). For example, spark timing may be selected (e.g., advanced or retarded) for the measured VCR position stuck compression ratio based on the actual or sensed VCR mechanism position, instead of setting spark timing for the intended compression ratio based on the commanded VCR mechanism position. In the absence of VCR mechanism degradation, spark timing adjustments may be nominally performed when a piston is at a certain position within a cylinder (e.g., before TDC) in order to maximize an amount of force on the piston produced by the expansion of combustion gases. Since the position of the piston within the cylinder at a given crank angle changes based on the VCR mechanism position, optimal spark timing also changes based on the VCR mechanism position. Therefore when the VCR mechanism is degraded and actual compression ratio where the engine is stuck is different from the intended compression ratio, spark timing is adjusted to compensate for the difference. The controller may select a spark timing for the stuck compression ratio by referring a map, algorithm, or look-up table with the sensed VCR mechanism position, engine speed, intake air temperature, MAP, MAP, and air-fuel ratio as the inputs and the spark timing as the output, for example.

Scheduling spark at the measured VCR position may include scheduling the spark based on the measured VCR position and further based on engine speed and load at the measured VCR position. In one example, at an engine speed of 2500 rpm and an engine load of 10 bar BMEP, a measured VCR position corresponding to a compression ratio of 13:1 may require spark to be scheduled at 2 deg BTDC. In another example, for the same engine speed and load, at a measured VCR position that provides a compression ratio of 8:1, spark may be scheduled at −22 deg BTDC.

At 220, method 200 includes determining if knock is detected. As described with respect to FIG. 1, knock may be detected based on output of a knock sensor (e.g., knock sensor 90 of FIG. 1) combined with output of a crankshaft acceleration sensor obtained during a defined knock window. In particular, the propensity for knock increases at high in-cylinder pressures, as may occur if the engine is operating at a higher than intended compression ratio for an extended duration. If knock is detected, method 200 proceeds to 222 to perform a knock mitigating action which includes retarding spark timing. For example, spark timing may be retarded from a nominal timing set based on the actual compression ratio when the VCR mechanism is not degraded at 210, or from a timing based on the stuck compression ratio when the VCR mechanism is degraded at 218. In one example, the nominal spark timing applied when the VCR mechanism is not degraded is more advanced than the spark timing applied when the VCR mechanism is degraded. As another example, at higher loads, when the engine is stuck at a higher compression ratio, spark may need to be more retarded to avoid knock. Following 222, method 200 exits.

If knock is not detected, method 200 proceeds to 224 and includes determining if pre-ignition is detected. Pre-ignition may be detected based on output of the knock sensor and the crankshaft acceleration sensor obtained during a pre-ignition window. For example, the pre-ignition timing window may occur at an earlier crank angle timing than the knock timing window. In one example, pre-ignition may be indicated in a cylinder when there is abnormal combustion before a spark event of that cylinder. In comparison, knock may be indicated in a cylinder when there is abnormal combustion after a spark event of that cylinder. In addition, knock may be detected based on the knock sensor output in the knock window relative to a knock threshold while pre-ignition may be detected based on the knock sensor output in the pre-ignition window relative to a pre-ignition threshold, the pre-ignition threshold higher than the knock threshold. In this way, pre-ignition may be distinguished from knock based on knock sensor output in distinct windows and relative to distinct thresholds.

If pre-ignition is not detected, method 200 proceeds to 226 and includes maintaining engine settings. For example, spark timing, fueling, and engine load may continue to be nominally adjusted based on engine operating conditions including changing operator torque demand. Following 226, method 200 exits.

If pre-ignition is detected, method 200 proceeds perform one or more pre-ignition mitigating actions which includes enriching the pre-igniting cylinder at 228. By increasing the amount of fuel delivered to the pre-ignition cylinder relative to the amount of air so as to operate the cylinder richer than stoichiometry results in a charge cooling effect which decreases the temperature within the pre-igniting cylinder. By cooling the cylinder, further occurrence of pre-ignition in the cylinder is mitigated. As fuel enrichment may degrade fuel economy, degrade exhaust emissions, and lead to a possible torque reduction, only the pre-igniting cylinder(s) may be selectively enriched.

At 230, method 200 includes (further) limiting the engine load to reduce the likelihood of further pre-ignition. For example, responsive to an indication of pre-ignition received while the engine is in the stuck compression ratio (where engine load was already limited, at 212), the engine load may be further limited. This may include further reducing an opening of the intake throttle valve and/or further increasing an opening of the wastegate actuator to further reduce intake air charge and maximum boost pressure allowed at the stuck compression ratio. The further limited engine load may be determined using a map, look-up table, or algorithm. Following 230, method 200 ends.

In this way, FIG. 2 provides a method for adjusting engine operation responsive to an indication of VCR mechanism degradation, which may reduce the propensity for abnormal combustion events, such as knock and pre-ignition. Reducing the occurrence of knock and pre-ignition may help extend the life of engine components.

Figure 3:
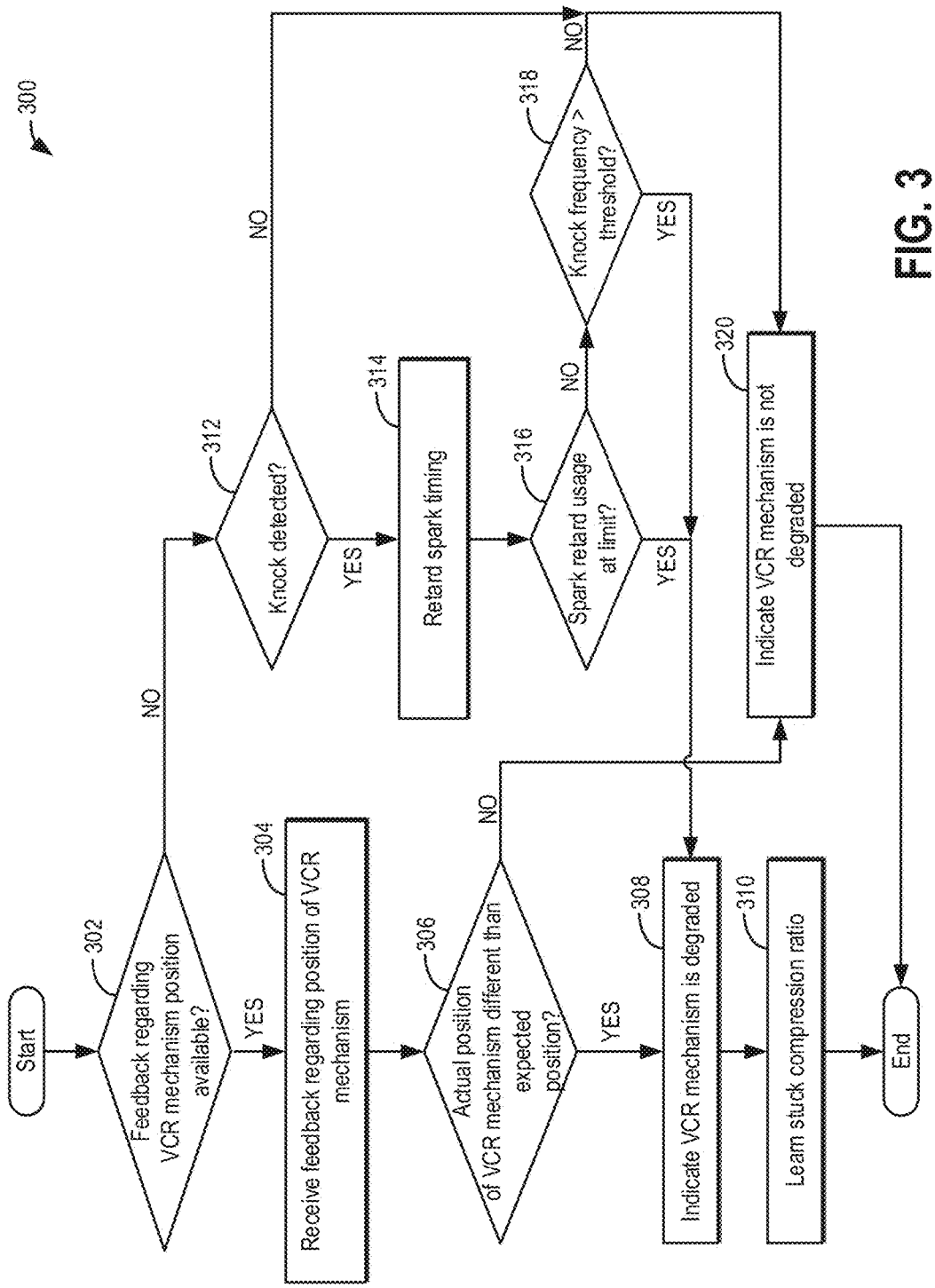
FIG. 3 shows a high level flow chart for identifying VCR mechanism degradation.
Figure 4:
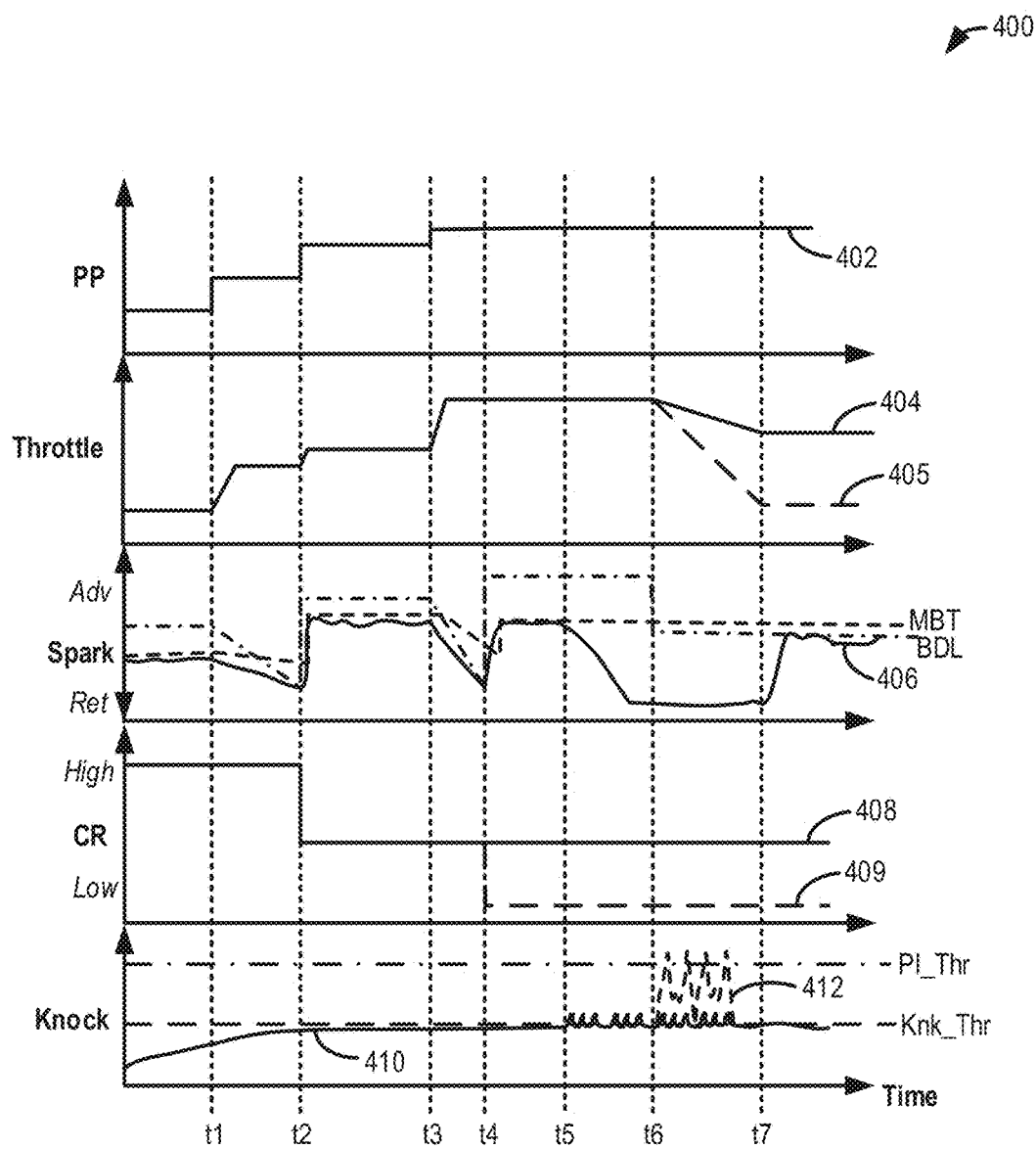
FIG. 4 shows a prophetic example of VCR and engine load adjustments during engine operation.

Turning now to FIG. 3, an example method 300 for determining if a VCR mechanism (e.g., VCR mechanism 194 of FIG. 1) of an engine is degraded is shown. As described with respect to FIG. 1, the VCR mechanism may be degraded if it becomes stuck at a cylinder compression ratio that is different from that intended. If the mechanism becomes stuck at a lower than intended compression ratio, a thermal efficiency of the engine may be decreased, leading to decreased fuel economy. If the mechanism becomes stuck at a higher than intended compression ratio, a propensity for knock and pre-ignition may be increased. Method 300 may be performed as part of method 200 of FIG. 2 (e.g., at 208), for example.

Method 300 begins at 302 and includes determining if feedback regarding the VCR mechanism position is available. For example, feedback regarding the VCR mechanism position may be available if a position sensor is coupled to the VCR mechanism (e.g., position sensor 196 of FIG. 1).

If feedback regarding the VCR mechanism position is available, method 300 proceeds to 304 and includes receiving feedback regarding the position of the VCR mechanism. For example, the position of the VCR mechanism may be determined based on output from the position sensor coupled to the VCR mechanism. In one example, determining the position of the VCR mechanism may include determining an actual compression ratio of the cylinder.

At 306, after determining the actual position of the VCR mechanism (herein also referred to as an actual VCR position), it may be determined if the actual (sensed) position of the VCR mechanism is different from an expected position. The expected or intended position may correspond to a VCR mechanism position based on a command send to the VCR actuator by the controller. The expected position may be a commanded position that provides a compression ratio selected by the controller based on the engine speed-load conditions (e.g., as selected at 204 of FIG. 2). If the VCR mechanism is degraded, the actual position may correspond to a different compression ratio than what is commanded.

If the actual position of the VCR mechanism is not different from the expected position (e.g., the actual position is the same as the expected position, or within a threshold of the expected position), at 320, the method includes indicating that the VCR mechanism is not degraded. With the VCR mechanism functioning, the controller may continue to adjust the compression ratio based on engine operating conditions via VCR mechanism adjustments (e.g., as previously elaborated at 210 of FIG. 2). Following 320, method 300 ends.

If the actual position of the VCR mechanism is different from the expected position (e.g., the actual position is outside a threshold of the expected position), at 308, the method includes indicating that the VCR mechanism is degraded. Indicating that the VCR mechanism is degraded may include setting a diagnostic trouble code (DTC) and may further include illuminating a malfunction indicator lamp (MIL) to alert a vehicle operator of the degradation condition. In one example, indicating that the VCR mechanism is degraded includes indicating that the VCR mechanism is stuck in a position that is different than intended, resulting in the engine operating in a compression ratio that is different from (e.g., higher or lower than) the intended compression ratio.

At 310, the method includes learning the measured (stuck) position and the corresponding stuck compression ratio. For example, the stuck compression ratio corresponding to the actual VCR mechanism position may be determined based on the feedback received from the VCR mechanism position sensor. Herein, the actual VCR position is a measured position. Subsequently, a maximum engine load and maximum boost pressure allowable at the stuck compression ratio may be limited (that is, reduced or lowered) to reduce the propensity of abnormal combustion events at the stuck compression ratio, for example, according to the method of FIG. 2. Following 310, method 300 ends.

Returning to 302, if feedback regarding the VCR mechanism position is not available, method 300 proceeds to 312 and includes determining if knock is detected. For example, knock may be detected based on output of a knock sensor coupled along an engine block (e.g., knock sensor 90 of FIG. 1) combined with output from a crankshaft acceleration sensor. In one example, knock may be determined in a cylinder when the output of a knock sensor coupled to that cylinder, the output sensed in a crank angle window that occurs after a spark event in the given cylinder, is higher than a knock threshold.

The inventors herein have recognized that operating at a high compression ratio, such as when the torque demand is elevated, can allow for increased thermal efficiency. However, when torque demand is elevated and the engine is operating at high engine speeds and loads, and with a high compression ratio, there is a propensity for knock. This propensity increases in boosted engine applications when a VCR mechanism gets stuck in a relatively high compression ratio. Therefore by monitoring the knock incidence in an engine when operating at a commanded compression ratio, it may be determined if the VCR mechanism is stuck. In particular, if the VCR mechanism is stuck in a higher than intended compression ratio state, knock incidence may start to increase, and spark retard usage may hit a clip. In another example, if the VCR mechanism is stuck in a lower than intended compression ratio state, the controller may attempt to move to a higher compression ratio and increase spark advance. If spark can be advanced of MBT at the highest commanded compression ratio without incurring knock at moderate to high engine loads, then the controller may determine that the VCR mechanism is stuck at a low compression ratio position, and operate spark no more advanced of MBT or to the borderline limit, as determined by the knock controller.

If knock is not detected, at 320, the method includes indicating that the VCR mechanism is not degraded. For example, even without feedback regarding the VCR mechanism position, it may be inferred that the engine is operating at the commanded compression ratio with the VCR mechanism not degraded if knock does not occur (or of the knock incidence is lower than a threshold).

If knock is detected, at 312, the method includes retarding spark timing at 314. By retarding spark timing responsive to the indication of knock, in-cylinder pressures may be decreased, thereby decreasing the propensity for further knock. An amount of spark retard applied may be determined based on the original spark timing and further based on the indication of knock. For example, as the indication of knock increases (e.g., as the output of the knock sensor exceeds the knock threshold), the amount of spark retard applied may be increased. As another example, when the base spark timing is closer to MBT, the amount of spark retard applied may be increased. In one example, spark timing may be decreased by 1-2 crank angle degrees responsive to the indication of knock.

At 316, method 300 includes determining if spark retard usage is at a limit. That is, it may be determined if spark retard usage is hitting a clip. The limit may be determined as a function of the commanded compression ratio. For example, a larger amount of spark retard usage (and thus a larger spark retard limit) may be tolerated when operating in a higher compression ratio, while a smaller amount of spark retard usage (and thus a smaller spark retard limit) may be tolerated when operating in a lower compression ratio. The limit may define a spark retard amount beyond which engine power losses, overheating tendencies, and high emissions may occur at the commanded compression ratio. Spark may not be further retarded from the limit.

If spark retard usage is at the limit, method 300 proceeds to 308 and includes indicating that the VCR mechanism is degraded, as described above. For example, if spark retard usage is at the limit, it may be determined that the VCR mechanism is stuck at a higher than intended compression ratio.

If the spark retard usage is not at the limit, method 300 proceeds to 318 and includes determining if the knock frequency is greater than a threshold. If the knock frequency is greater than the threshold, that is there is recurrent knock even with spark retard usage, method 300 proceeds to 308 and includes indicating that the VCR mechanism is degraded. Else, if the knock frequency is not greater than the threshold, method 300 proceeds to 320 and includes indicating that the VCR mechanism is not degraded. In alternate examples, instead of monitoring the knock frequency, the knock intensity for each knock episode may be integrated and if the integrated knock intensity over multiple knock episodes exceeds a threshold intensity, it may be determined that the VCR mechanism is degraded.

In still other examples, each of knocking intensity and spark retard usage may be combined to determine if the VCR mechanism is degraded. For example, in response to an integrated value determined from a combination of spark retard usage and knocking intensity for multiple knock episodes exceeding a threshold, it may be determined that the VCR mechanism is degraded. In one example, in response to each of spark retard hitting a clip or limit, and the knock frequency or integrated knock intensity reaching a threshold, it may be determined that the VCR mechanism is degraded.

In this way, an engine controller may indicate degradation of a variable compression ratio mechanism that mechanically alters a piston position within a cylinder based on one or more of output from a position sensor coupled to the mechanism, knock sensor output, and adaptive spark; and responsive to the indication, the controller may limit an engine load and advance spark timing, thereby reducing the likelihood of further knock or pre-ignition. For example, indicating degradation may include indicating that the engine is operating at a stuck compression ratio, different from an intended compression ratio. The indicating may include indicating degradation when one or more of an actual position of the mechanism based on the output of the position sensor is different from an expected position of the mechanism based on an intended compression ratio of the engine; knock frequency, based on the knock sensor output, is higher than a threshold frequency expected for the intended compression ratio, and adaptive spark is retarded to a threshold based on the intended compression ratio. Limiting the engine load may include lowering a maximum engine load and a maximum boost pressure allowable at the stuck compression ratio. In one example, limiting the engine load may be achieved through one or more of reducing an intake throttle opening at the stuck compression ratio, and increasing a wastegate actuator opening at the stuck compression ratio. Further, responsive to the indication, the controller may advance spark timing based on the stuck compression ratio, and independent of the intended compression ratio.

Turning now to FIG. 4, an example engine load adjustment responsive to VCR mechanism diagnosis is shown. Map 400 depicts pedal position (PP) indicative of operator torque demand at plot 402. Map 400 further depicts an intake throttle position at plot 404, spark timing at plot 406, cylinder compression ratio (CR) at plot 408, and knock sensor output at plot 410. Knock sensor output is shown relative to each of a knock threshold Knk_Thr and a pre-ignition threshold PI_Thr. Spark timing is shown in relation to MBT (dashed line) and borderline spark (BDL, dashed and dotted line). All plots are depicted over time along the x-axis.

Prior to t1, responsive to lower operator torque demand (plot 402), the engine is operating at a higher compression ratio (plot 408). For example, the engine is operating with the VCR mechanism actuated to a first position that corresponds to the higher compression ratio (high CR). In addition, the throttle opening is adjusted to a smaller degree of opening to meet the lower torque demand. Spark timing is held at or around MBT (for example, slightly retarded of MBT) at this time. Due to the engine operating with a lower engine speed and load, and at the higher compression ratio, the engine's knock propensity remains low, and actual knock does not occur as the knock sensor output remains below knock threshold Knk_Thr.

At t1, there is an operator pedal tip-in. For example, there is a transition from low to mid engine load conditions. Throttle opening is increased responsive to the increase in torque demand. Further, since the engine is not yet knock limited, the higher compression ratio is maintained. For example, the VCR mechanism is maintained in the first position that corresponds to the higher compression ratio. In addition, borderline spark (BDL, dashed and dotted line) and spark timing are retarded from MBT due to the engine's higher knock propensity at the higher engine load, and with the higher compression ratio (that is, the engine is more knock limited). The knock sensor output moves closer to the knock threshold, while remaining below it, indicating that the engine is more knock limited than it was before t1. However, actual knock does not occur as the knock sensor output remains below the knock threshold Knk_Thr.

At t2, there is a further increase in pedal position. If the engine were maintained in the higher compression ratio, the engine's knock propensity would increase resulting in the need for spark retard. The spark retard fuel penalty would offset the fuel efficiency of the higher compression ratio. Therefore, responsive to the change in torque demand, the engine is transitioned from the higher compression ratio to a lower compression ratio. For example, the VCR mechanism is commanded from the first position corresponding to the high CR to a second position corresponding to a lower CR. In addition, throttle opening is increased to meet the increased torque demand. As the compression ratio is lowered and the throttle opening is increased, the engine becomes less knock limited, and BDL can be advanced relative to its position before t2. In addition, spark timing may return to a nominal timing around MBT. Knock sensor output remains close to, but below, the knock threshold.

At t3, there is another operator pedal tip-in. Responsive to the increase in operator torque demand, throttle opening is increased while the engine is maintained at the lower compression ratio. For example, the VCR mechanism is maintained at the second position. As the engine becomes more knock limited under these conditions, BDL and spark timing are retarded from MBT while maintaining the knock sensor output below the knock threshold.

At t4, spark timing has been retarded to a point where the fuel penalty associated with spark retard offsets the fuel efficiency of operating in the selected compression ratio. Therefore at this time, the compression ratio is commanded to be further lowered. For example, the VCR mechanism is commanded from the second position to a third position corresponding to a compression ratio lower than the compression ratio at the second position. As a result of the lowering of the compression ratio, BDL is advanced and spark timing is also advanced to a nominal timing around MBT.

Following the commanded transition, specifically t5 onwards, knock propensity starts to increase. In particular, intermittent knock occurs as the knock sensor output intermittently exceeds knock threshold Knk_Thr. Responsive to each indication of knock, spark timing is gradually retarded from MBT.

Shortly before t6, spark timing is retarded to a limit (or clip) responsive to intermittent knock. Responsive to knock frequency being elevated even with spark timing retarded (to the clip), it may be inferred that the VCR mechanism was degraded during the transition commanded at t4. Specifically, it may be inferred that the actual compression ratio of the engine (depicted by solid line 408) is higher than the intended compression ratio of the engine (depicted by dashed line 409) due to the VCR mechanism being stuck in between the second and third positions. In one example, the stuck compression ratio may be inferred from a measured position of the VCR mechanism (in between the second and third positions), as indicated via a position sensor.

Responsive to the indication of VCR mechanism degradation, at t6, engine load is limited. Specifically, a maximum engine load that is allowable while operating in the measured VCR position (the stuck, higher than intended compression ratio) is lowered. In the depicted example, the engine load is lowered by reducing an intake throttle opening from a maximum throttle opening allowable to a lower throttle opening (plot 404, solid line). As a result, the air charge flowing to the engine is reduced. In alternate examples, the engine load may be additionally or optionally lowered by increasing the opening of an exhaust wastegate actuator coupled across an exhaust turbine driving an intake compressor. As a result, a maximum allowable boost pressure in the given CR is reduced. In addition to limiting the engine load, BDL and spark timing are retarded from MBT.

As such, if the engine load were not limited, the continued operation in the higher than intended CR would have resulted in elevated in-cylinder pressures and temperatures. This would have led to an increased incidence of knock. In addition, pre-ignition could occur, wherein the knock sensor output would exceed a pre-ignition threshold (PI_Thr) higher than the knock threshold (Knk_Thr). It will be appreciated that if pre-ignition does occur even after the engine load is lowered, such as shown by dashed segment 412, then engine load may be furthered lowered. For example, in response to an indication of pre-ignition after t6, the throttle opening may be further reduced (below the level shown at 404), such as shown by dashed segment 405.

At t7, after limiting the engine load, when the knock propensity has sufficiently decreased, BDL is advanced and spark timing is returned to around MBT, while maintaining the engine load limited and the throttle opening reduced.

In this way, a variable compression ratio mechanism may be timely diagnosed and accordingly addressed. By relying on adaptive spark being retarded to a clip when commanding a lower compression ratio, it may be reliably identified that a VCR mechanism is stuck in a higher than intended compression ratio position. By applying engine load limiting in response to the diagnosis of a VCR mechanism being stuck, knock and pre-ignition resulting from continued engine operation at the higher than intended compression ratio can be mitigated. By limiting intake aircharge to lower the allowable engine load and advancing spark timing from the spark retard limit when the variable compression ratio mechanism is stuck at a higher compression ratio than intended, in-cylinder pressures and temperatures can be lowered, thereby reducing the propensity for recurrent knock or pre-ignition. By reducing the thermal stress applied on an engine when a VCR mechanism is degraded, engine component life may be improved.

One example method comprises: mechanically varying a compression ratio of an engine via a variable compression ratio mechanism; and responsive to the mechanism being degraded, limiting an engine load. In the preceding example, additionally or optionally, the mechanism being degraded includes the engine being stuck in a compression ratio that is different from an intended compression ratio for a given engine speed-load condition. In any or all of the preceding examples, additionally or optionally, limiting the engine load includes limiting maximum engine load allowable based on the stuck compression ratio and independent of the intended compression ratio. In any or all of the preceding examples, additionally or optionally, limiting the engine load includes limiting an opening of an intake throttle to limit engine air charge at the stuck compression ratio. In any or all of the preceding examples, additionally or optionally, limiting the engine load includes limiting boost pressure by increasing an opening of an exhaust wastegate actuator coupled to an exhaust turbine. In any or all of the preceding examples, the method, additionally or optionally, further comprises indicating that the mechanism is degraded responsive to an actual position of the mechanism, based on sensor output from a position sensor coupled to the mechanism, being different from a commanded position of the mechanism, the commanded position based on the intended compression ratio for the given engine speed-load condition. In any or all of the preceding examples, the method additionally or optionally further comprises indicating that the mechanism is degraded responsive to one or more of adaptive spark being retarded beyond a threshold based on the intended compression ratio, and knock frequency being higher than a threshold frequency while adaptive spark is retarded. In any or all of the preceding examples, additionally or optionally, the method further comprises, advancing spark timing responsive to the limiting an engine load, the spark timing advance based on the stuck compression ratio. In any or all of the preceding examples, additionally or optionally, the method further comprises, responsive to an indication of knock received while in the stuck compression ratio, retarding spark timing. In any or all of the preceding examples, additionally or optionally, the method further comprises, responsive to an indication of pre-ignition received while in the stuck compression ratio, further limiting the engine load based on the indication of pre-ignition.

Another example method comprises: indicating degradation of a variable compression ratio mechanism that mechanically alters a piston position within a cylinder based on one or more of output from a position sensor coupled to the mechanism, knock sensor output, and adaptive spark retard usage; and responsive to the indication, limiting an engine load while advancing spark timing towards MBT. In the preceding example, additionally or optionally, indicating degradation includes indicating that the engine is operating at a stuck compression ratio, different from an intended compression ratio. In any or all of the preceding examples, additionally or optionally, the indicating includes indicating degradation when one or more of an actual position of the mechanism based on the output of the position sensor is different from an expected position of the mechanism based on an intended compression ratio of the engine; knock frequency, based on the knock sensor output, is higher than a threshold frequency expected for the intended compression ratio, and adaptive spark is retarded to a threshold based on the intended compression ratio. In any or all of the preceding examples, additionally or optionally, limiting the engine load includes lowering a maximum engine load and a maximum boost pressure allowable at the stuck compression ratio. In any or all of the preceding examples, additionally or optionally, limiting the engine load includes one or more of reducing an intake throttle opening at the stuck compression ratio, and increasing a wastegate actuator opening at the stuck compression ratio. In any or all of the preceding examples, additionally or optionally, the method further comprises, responsive to the indication, advancing borderline spark based on the stuck compression ratio and the engine load limiting, and independent of the intended compression ratio.

Another example engine system comprises: an engine having a cylinder; a variable compression ratio mechanism for mechanically altering a piston position within the cylinder; a position sensor coupled to the variable compression ratio mechanism; a spark plug for providing spark to the cylinder; an intake throttle; a turbocharger having an intake compressor driven an exhaust turbine; a wastegate including a wastegate actuator coupled to the exhaust turbine; a knock sensor; and a controller configured with computer readable instructions stored on non-transitory memory for: actuating the variable compression ratio mechanism to transition the engine from a higher compression ratio setting to a lower compression ratio setting; indicating that the mechanism is stuck at the higher compression ratio setting based on output from one or more of the position sensor and the knock sensor; and responsive to the indication, reducing an aircharge delivered to the engine while advancing spark timing. In the preceding example, additionally or optionally, the indicating includes indicating that the mechanism is stuck at the higher compression ratio setting responsive to one or more of a frequency of knock, as indicated based on the output from the knock sensor, being higher than a threshold frequency while spark timing is retarded, and an actual position of the mechanism, as indicated based on the output from the position sensor, being different from a commanded position, each of the commanded position and the threshold frequency based on the lower compression ratio setting. In any or all of the preceding examples, additionally or optionally, reducing the aircharge includes one or more of reducing an opening of the intake throttle and increasing an opening of the wastegate actuator to limit a maximum engine load allowable at the higher compression ratio setting. In any or all of the preceding examples, additionally or optionally, the controller includes further instructions for: responsive to an indication of pre-ignition, different from knock, as indicated based on the output of the knock sensor after reducing the intake aircharge, further limiting the maximum engine load allowable at the higher compression ratio setting.

In a further representation, a method for a boosted engine comprises commanding a variable compression ratio mechanism from a higher compression ratio setting to a lower compression ratio setting responsive to adaptive spark being retarded to a limit; and responsive to the mechanism being stuck at the higher compression ratio setting following the commanding, lowering a maximum engine load allowable at the higher compression ratio setting.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine operating method, comprising:
   mechanically varying a compression ratio of an engine via a variable compression ratio mechanism and a controller; and
   responsive to the variable compression ratio mechanism being degraded, limiting an engine load via adjusting a position of a throttle, the throttle adjusted via the controller.

2. The method of claim 1, wherein the variable compression ratio mechanism being degraded includes the engine being stuck in a compression ratio that is different from a commanded compression ratio for a given engine speed-load condition.

3. The method of claim 2, wherein limiting the engine load includes limiting maximum engine load allowable based on the stuck compression ratio.

4. The method of claim 3, wherein limiting the engine load includes limiting an opening of the throttle to limit engine air charge at the stuck compression ratio.

5. The method of claim 3, wherein limiting the engine load includes limiting a boost pressure generated via a compressor, the boost pressure limited via a waste-gate valve.

6. The method of claim 2, further comprising indicating that the variable compression ratio mechanism is degraded responsive to an actual position of the variable compression ratio mechanism, based on sensor output from a position sensor coupled to the variable compression ratio mechanism, being different from a commanded position of the variable compression ratio mechanism, the commanded position based on an intended compression ratio for the given engine speed-load condition.

7. The method of claim 2, further comprising indicating that the variable compression ratio mechanism is degraded responsive to adaptive spark being retarded beyond a threshold, the threshold based on the commanded compression ratio.

8. The method of claim 2, further comprising advancing spark timing via the controller responsive to limiting the engine load, the spark timing advance based on the stuck compression ratio.

9. The method of claim 8, further comprising, responsive to an indication of knock received via the controller while in the stuck compression ratio, retarding spark timing via the controller.

10. The method of claim 8, further comprising, responsive to an indication of pre-ignition received via the controller while in the stuck compression ratio, further limiting the engine load based on the indication of pre-ignition.

11. A method, comprising:
    indicating degradation of a variable compression ratio mechanism that mechanically alters a piston position within a cylinder via a controller based on one or more of output from a position sensor coupled to the mechanism, knock sensor output, and adaptive spark retard usage; and
    responsive to the indication, limiting an engine load while advancing spark timing via the controller, the engine load adjusted via adjusting a position of a throttle via the controller.

12. The method of claim 11, wherein indicating degradation includes indicating that an engine is operating at a stuck compression ratio, different from a commanded compression ratio.

13. The method of claim 12, wherein the indicating includes indicating degradation when one or more of an actual position of the mechanism based on the output of the position sensor is different from an expected position of the mechanism based on the commanded compression ratio of the engine; knock frequency, based on the knock sensor output, is higher than a threshold frequency expected for the commanded compression ratio, and adaptive spark is retarded to a threshold based on the commanded compression ratio.

14. The method of claim 12, wherein limiting the engine load includes lowering a maximum engine load and a maximum boost pressure allowable at the stuck compression ratio via the controller.

15. The method of claim 14, wherein limiting the engine load includes reducing an intake throttle opening at the stuck compression ratio.

16. The method of claim 12, further comprising, responsive to the indication, advancing borderline spark based on the stuck compression ratio and the engine load limiting, and independent of the commanded compression ratio.

17. An engine system, comprising:
an engine having a cylinder;
a variable compression ratio mechanism for mechanically altering a piston position within the cylinder;
a position sensor coupled to the variable compression ratio mechanism;
a spark plug for providing spark to the cylinder;
an intake throttle;
a turbocharger having an intake compressor driven an exhaust turbine;
a knock sensor; and
a controller configured with computer readable instructions stored on non-transitory memory for:
   actuating the variable compression ratio mechanism to transition the engine from a higher compression ratio setting to a lower compression ratio setting;
   indicating that the mechanism is stuck at the higher compression ratio setting based on output from one or more of the position sensor and the knock sensor; and
   responsive to the indication, reducing an intake air charge delivered to the engine via the intake throttle while advancing spark timing.

18. The system of claim 17, wherein the indicating includes indicating that the mechanism is stuck at the higher compression ratio setting responsive to one or more of a frequency of knock, as indicated based on the output from the knock sensor being higher than a threshold frequency while spark timing is retarded, and an actual position of the mechanism, as indicated based on the output from the position sensor, being different from a commanded position, each of the commanded position and the threshold frequency based on the lower compression ratio setting.

19. The system of claim 17, wherein reducing the intake air charge includes reducing an opening of the intake throttle.

20. The system of claim 19, wherein the controller includes further instructions for:
responsive to an indication of pre-ignition, different from knock, as indicated based on the output of the knock sensor after reducing the intake air charge, further limiting a maximum engine load allowable via the intake throttle at the higher compression ratio setting.

* * * * *